July 30, 1929.    A. W. MUELLER    1,722,476
CUTTING MACHINE
Filed March 12, 1928    3 Sheets-Sheet 1
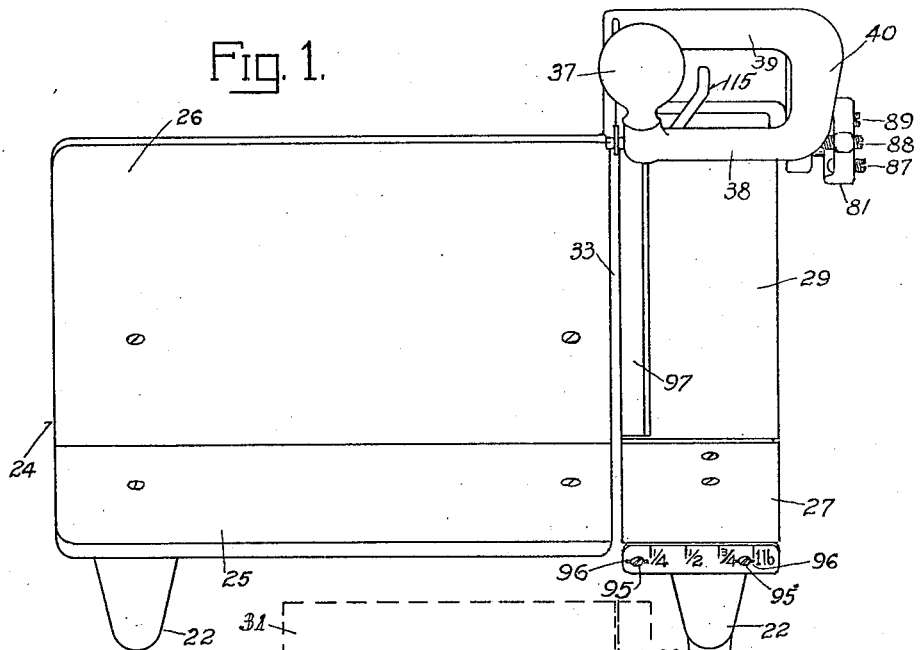
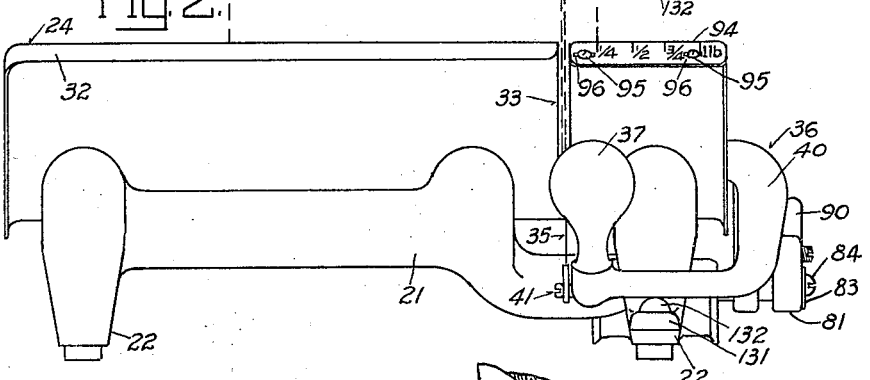
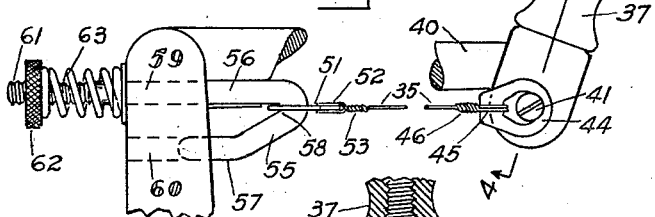
INVENTOR July 30, 1929.　　　A. W. MUELLER　　　1,722,476
CUTTING MACHINE
Filed March 12, 1928　　3 Sheets-Sheet 2
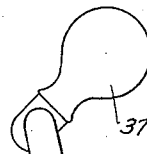
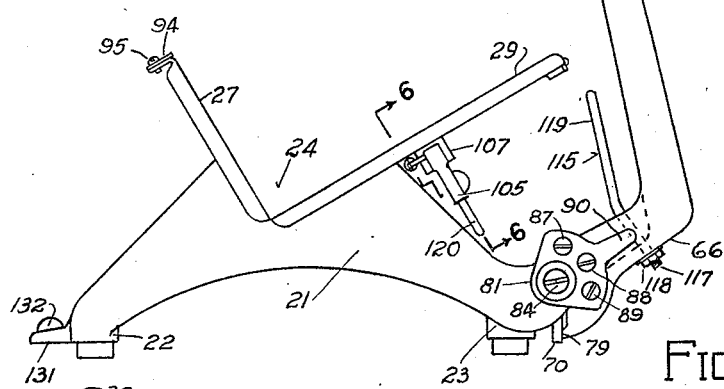
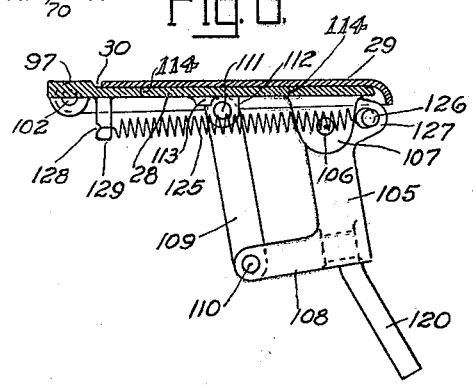
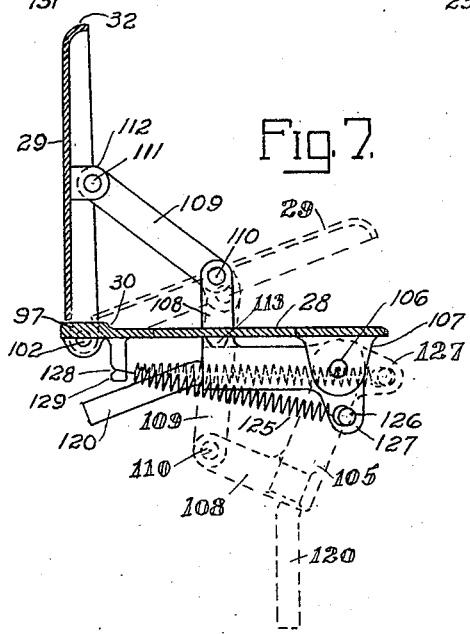
INVENTOR

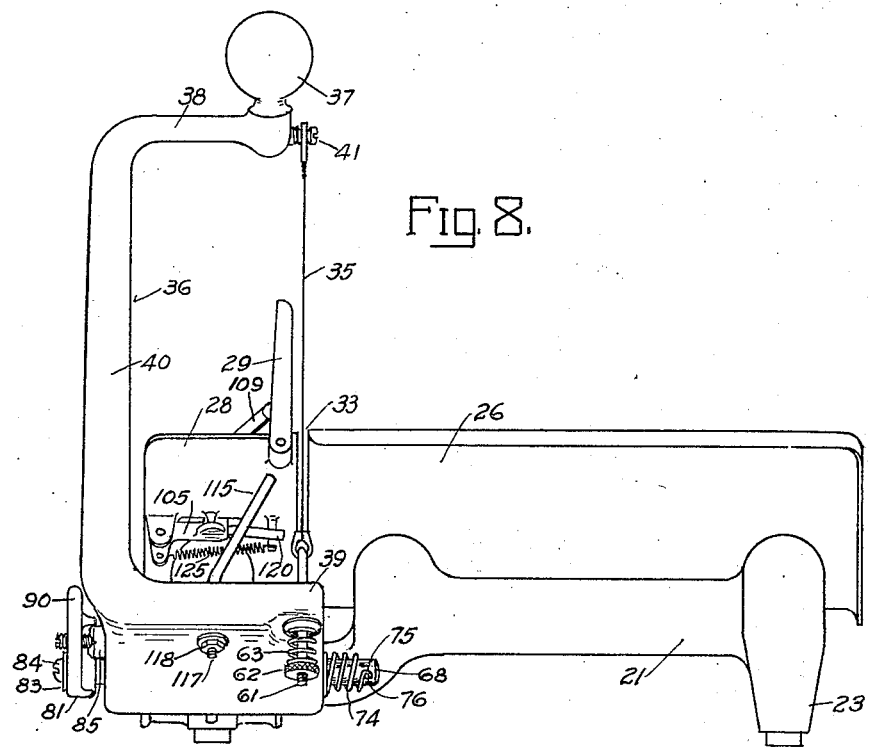
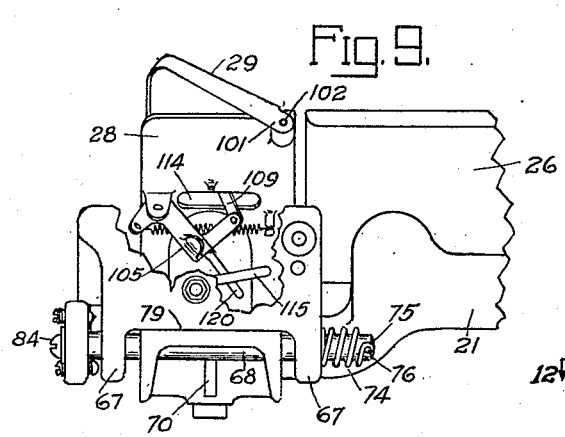
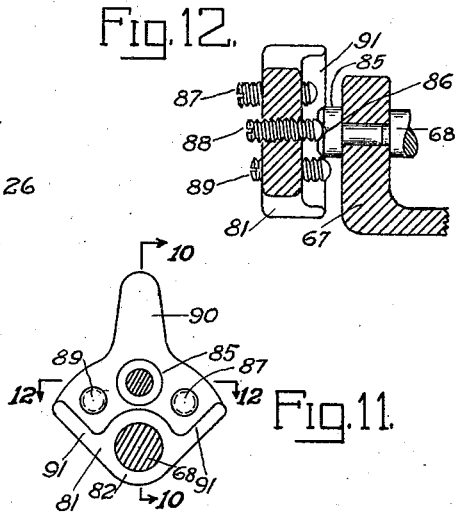
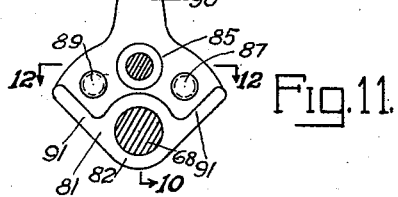
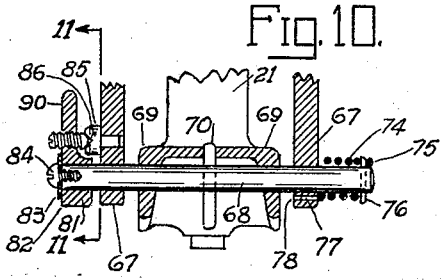

Patented July 30, 1929.

1,722,476

UNITED STATES PATENT OFFICE.

ARTHUR W. MUELLER, OF CINCINNATI, OHIO.

CUTTING MACHINE.

Application filed March 12, 1928. Serial No. 261,164.

My improved device is especially adapted for cutting cheese and similar substances.

My present device is an improvement on the cutting machine shown, described and claimed in my copending application for Letters Patent of the United States Serial No. 31,384, filed May 19, 1925, issued as Patent No. 1,662,890, dated March 20, 1928.

The material to be cut, instanced as cheese, is usually in the form of so-called bricks, which in practice weigh for instance five pounds each, but may be of different sizes, and are arranged to be cut into smaller pieces, for instance of one pound or fractions of a pound, or are arranged to be sliced to be served or to be used in sandwiches or the like.

Cheese of this kind is usually covered with tin foil, and is usually plastic, or soft and sticky, although in instances it is hard and brittle, and difficulty has been experienced heretofore in the successful cutting of the cheese, which difficulties have been solved by the device in my aforesaid copending application, issued as Patent No. 1,662,890, as aforesaid, and the improvements thereon herein shown, described and claimed.

It is the object of my invention to provide a support for the cheese in which there is a slot for the passage of the cutter, the support at one side of the slot including a plate arranged to be placed in the plane of the support when cutting larger pieces of cheese, and arranged to be employed as a stop when slicing the cheese; further, to provide an improved stop for use when slicing the cheese which is arranged to recede during the slicing operation for accommodating the slices being cut; further, to provide a plate arranged to sustain the slices being cut and to permit the portions of the slices progressively being cut to recede from the body of the material in order to avoid cohesion of the portion being cut to said body.

It is the object of my invention further to synchronize movement of a stop-plate for the slices being cut with the cutting means; further, to provide means controlled by movement of the cutting lever for causing recession of the stop-plate, and, further, to provide means for automatically returning the stop-plate to coactive position with the material.

It is the object of my invention further to provide a plate for supporting one end of the block of material to be cut when cutting pieces of substantial size from the block of material, means for permitting shifting of this plate into obstructing position with relation to the block of material, and means complemental to the cutting means for automatic retraction and return of the plate when in the latter relation; further, to so correlate said means that, when the plate is in supporting position, it is free of control of said automatic means, and when said plate is raised into obstructing position, it is subject to such automatic control; and, further, to provide control means for the plate for rigidly holding said plate in stop position, and for tripping said rigid holding means by actuation of the cutting means.

It is the object of my invention further to provide novel means for shifting the path of the cutter; further, to provide novel means for mounting the cutter; further, to provide the cutter with resilient resistance means for permitting the cutter to yield to undue stresses in the cutting operation; and, further, to provide yielding resistance means for the cutter whereby the cutter is arranged to yield in the direction of its length.

The invention will be further readily understood from the following description and claims, and from the drawings, in which latter:

Fig. 1 is a plan view of my improved device with the cutter in raised position.

Fig. 2 is a front elevation of the same, with the cutter in lowered position, and showing a block of material being cut thereby in dotted lines.

Fig. 3 is a side elevation of the cutter-arm and the cutter mounting means, partly broken away.

Fig. 4 is a detail of the same, taken in the plane of the line 4—4 of Fig. 3.

Fig. 5 is an end elevation of my improved device, with the cutter-arm in raised position, and the stop-plate in lowered position.

Fig. 6 is a cross-section of the same, taken on the irregular line 6—6 of Fig. 5.

Fig. 7 is a cross-sectional detail of the same, taken on the irregular line 6—6 of Fig. 5, showing the stop-plate in raised position in full lines and in partly lowered position in dotted lines.

Fig. 8 is a rear elevation of my improved device, with the cutter-arm and stop-plate in raised positions.

Fig. 9 is a rear elevation, partly broken away, with the cutter-arm in actuated position, and the stop-plate in correspondingly lowered position.

Fig. 10 is a detail view of the mounting for the cutter-arm, taken in the plane of the line 10—10 of Fig. 11.

Fig. 11 is a cross-sectional detail view of the same, taken in the plane of the line 11—11 of Fig. 10; and Fig. 12 is a detail sectional view of the same, taken in the plane of the line 12—12 of Fig. 11.

A suitable frame 21 is provided with feet 22, 23. A trough 24 is in the frame and is shown comprising plates 25, 26, 27, rigidly secured to the frame, a plate 28 also rigidly secured to the frame, and a plate 29 pivoted to the plate 28 and normally received in a rabbet 30 in the plate 28, and arranged to be moved into upright position at right angles to the supporting faces of the trough, for serving as an end stop for the piece of material, exemplified for instance as a block 31, which may be of cheese or other material. The plates in normal position form the walls of the trough in which the material is arranged to be placed. The plates 25, 26, 27, 29, preferably have marginal down-turned flanges 32 at their edges for providing a finished appearance and for strengthening the plates. A cutter-slot 33 is provided between the proximate ends of the plates 25, 26 and 27, 28, 29.

The walls of the trough are located at substantially right angles with respect to each other, with the angles between said walls presented downwardly, that is, the vertex of the angle is in lowermost position.

A cutter 35 is mounted in a knife-frame 36, the latter provided with a handle 37 for manipulation of the same. The knife-frame preferably extends in upward and forward direction when in normal retracted position. It is shown of bow-form, having laterally extending arms 38, 39, between which there is a connecting arm 40, which is arranged to swing past the outer end of the cutting portion of the material trough.

The cutter is exemplified as a wire stretched between the laterally extending ends of the arms 38, 39. One of the arms is provided with a screw 41 received in a threaded socket in the arm. The screw is provided with a groove 43 in which a loop 44 is received. This loop is shown as a loop-piece, and has one end of the wire fixed thereto, the loop-piece being provided with an eye received about the screw. The end of the cutter-wire is received a plurality of times through the eye, preferably with a plurality of loops 45, and is twisted by twists 46 about the cutting strand of the cutter-wire.

The other end of the cutter-wire is provided with a similar loop-piece 51, provided with an eye, through which the other end of the wire is received loopwise, preferably with a plurality of loops 52, the end of the wire being twisted, as by twists 53, to the cutting stretch of the cutter-wire.

The loop-piece 51 is received about a hook 55 provided with a shank 56 and a stem 57, the hook having a seat 58 in which the loop-piece 51 is seated when the wire is in stretched relation on the cutter-arm. The shank and the stem are parallel with each other. The shank 56 is received in a hole 59 and the stem 57 is received in a hole 60 in the inner end of the arm 39 for permitting axial sliding of the hook 55 and preventing rotation thereof.

The shank 56 is provided with a threaded portion 61, a nut 62 being threaded thereover. A spring 63 is located between the nut and the arm 39, and normally exerts a pull on the hook for stretching the cutter-wire, the adjustment of the nut providing means for adjusting the tension of the cutter-wire. The yielding of the hook permits the cutter-wire to yield upon excessive resistance by the material being cut so as to prevent snapping or breaking of the cutter-wire. The tension upon the cutter-wire may be adjusted according to the resistance of the material being cut, as a soft material will require less tension than a hard material.

When the cutter-arm is moved in cutting direction, and the cutter-wire contacts the block of material which, for example, is cheese covered with tin-foil, the corner of the block first contacted by the cutter-wire will normally offer greatest resistance. If such resistance should be greater than the normal resisting power of the cutter-wire, the cutter-wire will momentarily yield and be bowed upwardly, the cutter-wire yielding in the direction of its length by the yield of the spring 63, and thereby causing a lengthwise motion between the cutter-wire and the material, in addition to its normal crosswise and lengthwise motion hereinafter explained, for additionally aiding in cutting the material, the cutter-wire being retracted to normal position by the pull thereon of the spring, as soon as penetration of the material begins to take place, and thereby acting with a reverse endwise cutting motion upon the material and also in instances imparting a see-saw motion to the cutter-wire.

The cutter-frame is provided with an angular extension 66 extending at an angle with relation to the plane of the cutter-frame, the extension being provided with bearings 67 received about a shaft 68 in bearings 69 on the main frame. The shaft is shown as a stationary shaft, being held to the main frame by means of a pin 70. The pivot of the cutter-frame is thus located at the rear portion of the machine, below the rear end of the trough, and lower than the apex of the trough. This arrangement of the parts causes the cutter to move crosswise of the material, supplemented by a lengthwise movement of the cutter, for giving the cutter a shearing motion with relation to the material, and thus providing an easy cutting motion for cutting the material.

The means exemplified for positioning the cutter laterally with relation to the walls of the slot in the trough, comprise shifting of the bearings 67 of the cutter-frame laterally on the shaft 68. A spring 74 is provided at one end with a hook 75, hooked about a pin 76 in a shaft 68. The other end of the spring is bent, the bent end 77 thereof being received in a hole 78 in one of the bearings 67. This spring normally counterbalances the cutter-frame and holds the cutter-frame in upward or in retracted position, in which position the rear edge 79 of the cutter-frame is arranged to strike the pin 70. It also causes movement of the cutter-frame lengthwise on the shaft 68.

A positioning part 81 has a bearing 82 about the shaft 68 and is held on said shaft by means of a washer 83 fixed to the end of the shaft by a screw 84. A lug 85 on one of the bearings 67 is provided with a slot 86. Positioning screws 87, 88, 89, are threaded into the positioning part 81, the inner ends of said positioning screws being arranged to be respectively received in the slot 86 in the lug 85.

The screws are adjusted for different distances toward the cutter-frame and the spring 74 urges movement of the cutter-frame toward the positioning part 81. The positioning part is provided with a handle 90, by means of which the positioning part is rotated about the shaft 68 for causing registry of any one of the screws 87, 88, 89, with the coacting positioning part or lug 85 on the cutter-frame. The positioning part 81 is provided with a flange 91, the walls of which serve as stops coacting with the lug 85 for maintaining the screws on the stop-part in coactive relation with the lug on the cutter-frame and preventing movements of the screws on the positioning part 81 out of range with the coacting lug on the cutter-frame. The screws on the positioning part readily ride over the lug on the cutter-frame when rotating the positioning part 81.

The movement of the positioning part 81 causes lateral movement of the cutter for causing greater or less approach of the cutter toward one or the other of the walls of the slot 33.

The flange 32 of the plate 27 is provided with a gage 94, adjustably positioned lengthwise with relation to the plate 27 by means of screws 95, received through slots 96 in the gage into threaded holes in the flange. This gage is intended to be used when cutting material into pieces gaged by weight.

The plate 29 normally rests in the rabbet 30 in the plate 28, so that the upper surface of the plate 29, the portion 97 of the plate 28 and the upper face of the plate 26 are in the same plane, for movement of the block of material thereover, for instance in positioning the block of material according to the divisions of the gage 94, when cutting off a piece by weight, as shown at 98. The plate 29 is also arranged to act as a stop-plate for the block of material, principally when slicing the material for ready use in sandwiches or for similar purposes.

For accomplishing this the plate 29 is shown provided with bearing lugs 101, received over pivot-pins 102 on the plate 28, the contact face of the plate 29 being so arranged that when the plate 29 is at right angles or perpendicular to the walls of the trough, its normal supporting face serves as a stop-face for the end of the block of material, the stop-face being in substantial registry with the slot in the trough.

When the stop-plate is employed as a stop, it preferably recedes from the end of the material during the cutting operation. This is done primarily for the reason that material of this nature is usually plastic and a cut piece has affinity for the face from which it is cut and is likely to adhere thereto; furthermore, the thickness of the cutter is projected into the material so that there is a tendency to squeeze the slice being cut by the interposing of this thickness of the cutter between it and the block of material.

The stop-face preferably supports the end of the material until entry of the cutter into the material. The part of the material cut is thereupon permitted to recede from the block of material by the recession of the stop-plate, the slice releasing itself from the block of the material as the cutter proceeds, and lying against the receding stop-plate throughout greater portions of its area as the cutter proceeds through the material and the stop-plate recedes.

When the slice has been severed, it is removed while the cutter is still in down position and the stop-plate is in retracted inclined position, whereupon the cutter-arm is raised, the stop-plate also rising automatically to stop position, so that the block of material can be moved thereagainst for cutting the next slice, the thickness of the slice being governed by the position of the cutter-arm controlled by the adjustable positioning parts.

A lever 105 is pivoted on a pin 106 between bearing lugs 107 depending from the plate 28. The lever 105 is a double bell-crank lever, and is provided with an arm 108. A link 109 is articulated with the arm 108 at 110 and is articulated at 111 with a lug 112 depending from the plate 29 for moving the plate on its pivots. The lever 105 coacts with a contact-lug 113 on the bottom of the plate 28 when the lever is in raised position for locating the stop-plate in proper position with relation to the trough. The lever 105 and the link 109 move in a slot 114 in the plate 28.

An arm 115 is secured to the extension 66 of the cutter-arm, as by having its threaded end 117 threaded in a threaded hole in said extension and clamped in place by means of a jam-nut 118. The arm 115 is provided with a bent portion 119. Rotation of the arm in its threaded hole correctly locates the bent portion 119. The lever 105 is provided with a coacting contact portion 120. The coacting contact portions 119 and 120 are so related, that the contact portion 119 of the arm 115 on the cutter-frame interferes with the contact portion 120 of the lever 105, when the stop-plate 29 is in stop-position, for moving the lever 105 and swinging it on its pivot 106 and thereby depressing the arm 108 and the link 109, and moving the stop-plate into depressed inclined position. (See dotted lines Fig. 7.)

When the cutter-frame is retracted, the stop-plate automatically rises into stop position. This is caused by means of a spring 125, one end of which is received about a pin 126 in an arm 127 on the lever 105, and the other end of the spring is received in a recess 128 in a pin 129 depending from the plate 28. This spring is shown as a spiral spring, the longitudinal axis of which extends between the longitudinal center of the pin 126 at one end of the spring and the securing point represented as the bottom of the recess 128 in the pin 129. When the right line between the latter securing point and the axis of the pin 126, represented as the longitudinal axis of the spiral spring 125 (Fig. 6), is above the pivotal axis of the pivot 106 of the bell-crank lever 105, the spring draws the arm 108 of the bell-crank lever downwardly, thereby drawing the plate 29 downwardly into lowermost position with its top surface substantially in the plane of the top surface of the plate 26. When said right line is below the pivotal axis of the pivot 106, (Fig. 7), the tendency of the spring is to move the arm 108 of the lever 105 upwardly for swinging the stop-plate 29 on its pivot and raising the stop-plate. If the contact portion 120 of the lever 105 is unobstructed, the arm 108 will move upwardly to full extent for causing positioning of the stop-plate at right angles to the supporting face of the trough. The limits of these movements are indicated by the showing of the parts respectively in full lines and in dotted lines in Fig. 7.

The coaction between the contact-portion 119 of the contact-arm 115 and the contact portion 120, when the cutter-arm is moved in cutting direction, causes swinging of the lever 105 on its pivot 106, for depressing said lever and retracting the stop-plate. This depression of the lever, however, is insufficient to cause the longitudinal axis of the spring 125 to pass the pivotal axis of the pivot 106 of the lever 105. The tendency of the spring therefore remains to swing the stop-plate upwardly, which occurs when the cutter-arm is raised.

When the stop-plate is raised to full extent, the pivotal axis of the pivot 110 is moved into or beyond a right line between the pivotal axes of the pivots 111, 106, so that pressure upon the stop-face of the stop-plate urges pressure between the lever 105 and the lug 113 on the lower face of the plate 28, for maintaining the stop-plate in stop position. If it is desired to manually lower the stop-plate from stop position, the pivot 110 is depressed manually to move it beyond a right line between the pivots 111, 106, whereupon the stop-plate may be swung into lowermost position, and the stop-plate remains in lowermost position by reason of the fact that the axis of the spring 125 has passed the right line between the attaching point 128 of the spring and the axis of the pin 126, as exemplified in Fig. 6.

The frame is provided with a lug 131 which receives a cushioning plug 132 for cushioning the cutter-arm when depressed.

In operation, when it is desired to cut a piece by weight from the block of material, the block of material is placed in the trough 24, the block being moved along the plates 25, 26, 27, 29, so that the piece to be dispensed is moved across the cutter-slot 33, the extreme end of the block of material being positioned according to the markings on the gage 94, (Fig. 1), and the cutter-frame is then swung downwardly on its pivot-shaft 68, the cutter 35 thereon passing through the block for severing the piece to be dispensed.

The material, for instance cheese, is usually covered with tin-foil. The upwardly presented corner of the block first contacted by the cutter-wire normally offers greatest resistance. If such resistance be greater than the normal strength of the cutter-wire, the cutter-wire will momentarily yield upwardly and also yield in the direction of its length by the yielding of the spring 63, (Fig. 3), permitting yielding of the hook 55 in parallel lines, due to the shank 56 and the stem 57, which are parallel with each other, being located in the parallel holes 59, 60, in the arm 39 of the cutter-frame. As soon as this corner has been penetrated, the cutter-wire will straighten out, aiding in the cutting operation, and the form and mounting of the cutter-frame and provision of the angular extension 66 thereon, (Fig. 5), supplements the crosswise movement of the cutter-wire with a lengthwise movement thereof in the cutting operation, for producing a shearing motion with relation to the material.

If it is desired to cut thin slices off of the block, the plate 29 is employed as a stop, by mounting the same pivotally on pivots 102, (Figs. 6 and 7), means provided causing recession of this stop-plate during the cutting operation for permitting the slice to free itself from the body of the block as it is being cut.

These means are exemplified as the lever 105 pivoted at 106 under the plate 28 below the plate 29, (Figs. 5 to 10, inclusive), a link 109 connecting the arm 108 of said lever with the stop-plate 29 by pivots 110, 111, the stop-plate being normally urged into stop position by means of a spring 125 between a pin 126 on an arm 127 of the lever 105 and the wall of a recess 128 on a pin 129 extending downwardly from the plate 28.

The cutter-frame is provided with an arm 115, the bent portion 119 of which coacts with the arm 120 on the lever 105, for depressing the arm 120 when the cutter-frame is swung forwardly, and thereby causing recession of the stop-plate 29 during the cutting movement of the cutter-frame, the stop-plate 29 again moving into stop position when the cutter-frame is retracted. Repeated slices may thus be cut from the block, the stop-plate automatically moving into and out of stop position by movements of the cutter-frame. This is due to the fact that during such movements the axis of the spring 125 remains below the pivotal axis 106 of the lever 105. (Fig. 7.)

If it is desired to again move the stop-plate 29 into the plane of the plate 26, the lever 105 is swung on its pivot 106 so as to raise its arm 127 and place the axis of the spring 125 above the pivotal axis of the pivot 106. (Fig. 6.)

If it is desired to adjust the thickness of the slices, the cutter is moved laterally, accomplished by moving the cutter-frame laterally on its pivot-shaft 68. (Fig. 10.) This is exemplified as accomplished by a spring 74, which urges the pivot-shaft 68 axially in one direction, for coaction of stop screws 87, 88, 89, on a positioning part 81 with a lug 85. The positioning part is instanced as on the pivot-shaft 68 and the coacting lug 85 as on the cutter-frame, but it is obvious that these parts may be transposed, the lug 85 being placed on the axially urged pivot-shaft 68 and the positioning part 81 on or against the cutter-frame.

My improved device provides simple means for accomplishing the cutting operations and for controlling the portions being cut, and provides simple means whereby cutting of the material is assured without breakage of the cutter, and provides simple means readily operated for determining the thickness of slices cut, and for readily arranging the machine for cutting slices or for cutting larger portions, and provides simple means for supporting slices while being cut and insuring the severance thereof from the block of material from which it is being cut. My improved device also provides economical means of simple construction arranged to be assembled in simple manner for providing an economical machine for the purposes described.

Having thus fully described my invention, what I claim as new, and desire to secure by Letters Patent, is:

1. In a cutting machine of the character described, the combination of a trough provided ith a cutter-slot, a cutter-frame, a cutter thereon arranged to operate in said cutter-slot, a movable stop-plate in said trough at the cut-off side of said cutter-slot, means for tilting said stop-plate for causing it to extend crosswise of said trough for serving as a stop for the material in said trough, and means having operative connection with said cutter-frame causing retraction of said stop-plate from the path of said cutter during movement of said cutter in cutting direction in said cutter-slot.

2. In a cutting machine of the character described, the combination of a trough provided with a cutter-slot, a cutter-frame, a cutter thereon arranged to operate in said cutter-slot, a movable stop-plate in said trough at the cut-off side of said cutter-slot, means for tilting said stop-plate for causing it to extend crosswise of said trough for serving as a stop for the material in said trough, means having operative connection with said cutter-frame causing retraction of said stop-plate from the path of said cutter during movement of said cutter in cutting direction in said cutter-slot and resilient means acting reversely on said last-named means causing automatic return of said stop-plate to stop position upon retraction of said cutter-frame.

3. In a cutting machine of the character described, the combination of a trough provided with a cutter-slot, a cutter-frame, a cutter thereon arranged to operate in said cutter-slot, a stop-plate in said trough at the cut-off side of said cutter-slot, coacting contact means having operative connections with said cutter frame and with said stop-plate causing retraction of said stop-plate with relation to said cutter-slot during cutting movement of said cutter-frame, and spring means causing normal automatic return of said stop-plate to stop position.

4. In a cutting machine of the character described, the combination of a trough provided with a cutter-slot, a cutter-frame, a cutter thereon arranged to operate in said cutter-slot, a stop in said trough at the cut-off side of said slot, a lever having operative connection with said stop, and an arm on said cutter-frame coacting with said lever for operating said stop.

5. In a cutting machine of the character described, the combination of a trough provided with a cutter-slot, a cutter-frame, a cutter thereon arranged to operate in said cutter-slot, a stop in said trough at the cut-off side of said slot, a spring normally urging said stop into stop position, a lever, and a link articulated with said lever and with said stop, the axis of said articulation between said lever and said link passing into a right line between the pivotal axis of said lever and the axis of said articulation of said link with said stop when moving said stop into stop position for locking said stop in stop position.

6. In a cutting machine of the character described, the combination of a trough provided with a cutter-slot, a cutter-frame, a cutter thereon arranged to operate in said cutter slot, a stop in said trough at the cut-off side of said slot, a spring normally urging said stop into stop position, a lever, and a link articulated with said lever and with said stop, the axis of said articulation between said lever and said link passing into a right line between the pivotal axis of said lever and the axis of said articulation of said link with said stop when moving said stop into stop position for locking said stop in stop position, and a stop for said lever for stopping said material-stop in a position substantially perpendicular to the supporting face of said trough.

7. In a cutting machine of the character described, the combination of a trough provided with a cutter-slot, a cutter-frame, a cutter thereon arranged to operate in said slot, a material-stop in said trough at the cut-off side of said slot, a lever pivoted under said trough having operative connection with said material-stop, said lever provided with a striker-part, and a striker-arm on said cutter-frame coacting with said striker-part for moving said lever and causing retraction of said material-stop during cutting movement of said cutter-frame.

8. In a cutting machine of the character described, the combination of a trough provided with a cutter-slot, a cutter-frame, a cutter thereon arranged to operate in said slot, a material-stop in said trough at the cut-off side of said slot, a lever pivoted under said trough having operative connection with said material-stop, said lever provided with a striker-part, a striker-arm on said cutter-frame coacting with said striker-part for moving said lever and causing retraction of said material-stop during cutting movement of said cutter-frame and a spring automatically returning said material-stop to stop position upon retraction of said cutter-frame and movement thereby of said striker-arm away from said striker-part.

9. In a cutting machine of the character described, the combination of a trough provided with a cutter-slot, said trough having a supporting face for the material to be cut, a stop-plate in said trough having a supporting face normally in substantially the plane of said first-named supporting face, a pivot between said stop-plate and said trough, a lever pivoted to said trough under the plane of said first-named supporting face, said lever provided with an arm arranged to extend above the plane of said first-named supporting face, a link articulated to the end of said arm and to said stop-plate, said articulation between said link and said arm arranged to extend into a right line between the pivot of said lever and said articulation between said link and said stop-plate, and a spring operatively disposed between said trough and said lever, said spring having a longitudinal axis which is located at one side of the pivot of said lever when said stop-plate is in material supporting position and at the other side of said pivot of said lever when said stop-plate is in material stopping position.

10. In a cutting machine of the character described, the combination of a trough-frame, a trough thereon provided with a cutter-slot, a cutter-frame, a cutter thereon arranged to operate in said cutter-slot, a pivot-shaft in said trough-frame on which said cutter-frame is pivoted, a spring normally urging said cutter-frame laterally in one direction, and a series of stops operatively disposed between said trough-frame and said cutter-frame respectively urged into coactive relation by said spring and arranged to selectively position said cutter-frame laterally for adjusting the path of said cutter in said cutter-slot.

11. In a cutting machine of the character described, the combination of a trough-frame, a trough thereon provided with a cutter-slot, a cutter-frame, a cutter thereon arranged to operate in said cutter-slot, a pivot-shaft in said trough-frame on which said cutter-frame is pivoted, a spring normally urging said cutter-frame in one direction, and a rotatable stop-part rotatable about the axis of said shaft, said rotatable stop-part and said cutter-frame provided with a series of coacting stops arranged for adjustably shifting said cutter-frame along said axis and thereby adjusting the path of said cutter in said cutter-slot.

12. In a cutting machine of the character described, the combination of a trough-frame, a trough thereon provided with a cutter-slot, a cutter-frame, a cutter thereon arranged to operate in said cutter-slot, a pivot-shaft axially positioned in said trough-frame, said cutter-frame having bearings about said shaft axially movable thereon, a spring normally urging said cutter-frame in one axial direction on said shaft, said cutter-frame provided with a stop-lug, a stop-part rotatable about said shaft, and a plurality of screws on said stop-part arranged to be adjusted to different axial positions in said stop-part and coacting with said stop-lug for adjusting said cutter-frame axially on said shaft resisted by the tension of said spring for laterally adjusting the path of said cutter in said cutter-slot, and said stop-part provided with end-stops coacting with said stop-lug for limiting rotative movements of said rotatable stop-part.

13. In a cutting machine of the character described, the combination of a trough for the material to be cut, a cutter-frame arranged to move crosswise of said trough for cutting said material, a cutter-wire, anchoring means on said cutter-frame for one end of said cutter-wire, and anchoring means on said cutter-frame for the other end of said cutter-wire, said last-named anchoring means comprising an axially movable shank, a hook and a stem at the free end of said hook, said shank and said stem being parallel with each other, parallel bearings on said cutter-frame in which said shank and said stem have axial movements, for permitting yielding of said cutter-wire and maintaining said cutter-wire on said hook, a spiral spring surrounding said shank, and a threaded adjusting part on said shank for adjusting said spring and thereby adjusting the tension of said cutter-wire.

14. In a cutting machine of the character described, the combination of a trough for the material to be cut, a cutter-frame arranged to move crosswise of said trough for cutting said material, a cutter-wire, anchoring means on said cutter-frame for one end of said cutter-wire, and anchoring means on said cutter-frame for the other end of said cutter-wire, said last-named anchoring means comprising a hook comprising a shank and a stem parallel with each other, bearings on said cutter-frame in which said shank and said stem are axially guided, said shank provided with a threaded portion, a nut threaded to said threaded portion, and a spring between said cutter-frame and said nut, the yielding of which spring is adjustable by said nut for adjusting the tension of said cutter-wire.

15. In a cutting-machine of the character described, the combination of a trough for the material to be cut, a cutter-frame arranged to move crosswise of said trough for cutting said material, a cutter-wire, loops at the respective ends of said cutter-wire, releasing attaching means on said cutter-frame for one of said loops, a hook releasably received in the other of said loops, said hook comprising a shank and a stem between which said last-named loop is received, bearings on said cutter-frame for said shank and said stem in which said shank and said stem have axial movement, said shank having a threaded outer end, a nut adjustable on said threaded outer end, and a spring about said shank between said nut and said cutter-frame, constructed and arranged for adjusting the tension of said cutter-wire, and said stem being shorter than said shank whereby said last-named loop may be placed on and removed from said hook while said shank is retained in its bearing.

In testimony whereof, I have hereunto signed my name.

ARTHUR W. MUELLER.